United States Patent
Houžvička et al.

(10) Patent No.: US 10,976,451 B2
(45) Date of Patent: Apr. 13, 2021

(54) METHOD OF SHORTENING SCINTILLATION RESPONSE OF LUMINESCENSE CENTRES AND MATERIAL OF SCINTILLATOR WITH SHORTENED SCINTILLATION RESPONSE

(71) Applicants: CRYTUR, SPOL.S R.O., Turnov (CZ); FYZIKÁLNÍ ÚSTAV AV ČR, V.V.I., Prague (CZ)

(72) Inventors: Jindřich Houžvička, Turnov (CZ); Karel Blažek, Turnov (CZ); Petr Horodyský, Moravany (CZ); Martin Nikl, Prague (CZ); Pavel Boháček, Prague (CZ)

(73) Assignees: CRYTUR, SPOL.S R.O., Turnov (CZ); FYZIKÁLN.Í ÚSTAV AV CR, V.V.I, Prague (CZ)

( * ) Notice: Subject to any disclaimer, the term of this patent is extended or adjusted under 35 U.S.C. 154(b) by 344 days.

(21) Appl. No.: 15/763,836

(22) PCT Filed: Oct. 5, 2016

(86) PCT No.: PCT/CZ2016/000112
§ 371 (c)(1),
(2) Date: Mar. 28, 2018

(87) PCT Pub. No.: WO2017/059832
PCT Pub. Date: Apr. 13, 2017

(65) Prior Publication Data
US 2018/0284300 A1 Oct. 4, 2018

(30) Foreign Application Priority Data
Oct. 9, 2015 (CZ) .................. CZ2015-711

(51) Int. Cl.
*G01T 1/202* (2006.01)
*C09K 11/77* (2006.01)
*G21K 4/00* (2006.01)

(52) U.S. Cl.
CPC ........ *G01T 1/2023* (2013.01); *C09K 11/7774* (2013.01); *G01T 1/202* (2013.01); *G21K 4/00* (2013.01)

(58) Field of Classification Search
CPC ..... G01T 1/2023; G01T 1/202; C09K 11/778; C09K 11/7774; C09K 11/7797
See application file for complete search history.

(56) References Cited

U.S. PATENT DOCUMENTS

| | | | | |
|---|---|---|---|---|
| 5,518,658 A | * | 5/1996 | Rossner | C04B 35/50 252/301.4 S |
| 5,560,867 A | * | 10/1996 | Grabmaier | C04B 35/50 252/301.4 S |
| 6,358,441 B2 | * | 3/2002 | Duclos | C09K 11/7769 252/301.4 R |
| 7,618,491 B2 | * | 11/2009 | Kurata | C30B 29/34 117/13 |
| 8,278,624 B2 | * | 10/2012 | Koschan | C09K 11/7774 117/19 |

FOREIGN PATENT DOCUMENTS

| | | |
|---|---|---|
| EP | 1829950 | 9/2007 |
| JP | 2013047334 A | 3/2013 |
| WO | 2012058440 | 5/2012 |
| WO | 2012066425 | 5/2012 |
| WO | 2014171985 | 10/2014 |
| WO | WO 2014/155256 | * 10/2014 |

OTHER PUBLICATIONS

M Nikl et al., "An Effect of ZR4+ Codoping of YAP:CE Scintillator", Nuclear Instruments and Methods in Physics Research A ,vol. 436, pp. 250-253, Jun. 21, 2002.*
M. Nikl et al. "An Effect of ZR4+ Co-Doping of YAP:CE Scintillator" Nuclear Instruments and Methods in Physics Research A vol. 486 pp. 250-253, Jun. 21, 2002, Elsevier, available at: https://kundoc.com/pdf-an-effect-of-zr4-co-doping-of-yapce-scintillator.html.

* cited by examiner

*Primary Examiner* — C Melissa Koslow
(74) *Attorney, Agent, or Firm* — Mark M. Friedman

(57) ABSTRACT

Currently, the known method of shortening the scintillation response of scintillation material is to suppress the amplitude-minor slower components of the scintillation response, whereas the possibilities of significant shortening of the amplitude-dominant component of the scintillation response in this method are limited. The invention concerns the method of shortening the scintillation response of scintillator luminescence centres which uses co-doping with Ce or Pr together with co-doping with ions from the lanthanoids, 3d transition metals, 4d transition metals or $5s^2$ or $6s^2$ ions group. Having had the luminescence centres electrons excited as a result of absorbed electromagnetic radiation, the scintillator created in this method is capable of taking away a part of the energy from the excited luminescence centres via a non-radiative energy transfer, which results in a significant shortening of the time of duration of the amplitude-dominant component of the scintillation response.

1 Claim, 9 Drawing Sheets

METHOD OF SHORTENING SCINTILLATION RESPONSE OF LUMINESCENSE CENTRES AND MATERIAL OF SCINTILLATOR WITH SHORTENED SCINTILLATION RESPONSE

FIELD OF THE INVENTION

The present invention refers to the method of shortening the scintillation response of a scintillator for the detection of ionizing radiation and to the scintillator material with a fast scintillation response to the incident ionizing radiation.

BACKGROUND OF THE INVENTION

The scintillation material, that is the scintillator, absorbs ionizing particles or photons with energies sufficient for the ionization of the environment in which it is located, i.e. generally in VUV (above 7 eV) or in the more short-wave region of the electromagnetic spectrum, and emits ionizing particles or photons with lower energy in the relevant region of the electromagnetic spectrum. The absorption of ionizing radiation in any environment induces excited states of electrons of scintillator atoms, molecules or ions in the crystal lattice. The most frequently used scintillators emit the radiation in a fast, efficient and reproducible method in the visible spectrum region in the so-called scintillation response, that is in the scintillation decay, as a reaction to the absorption of ionizing radiation which is generally outside the visible spectrum region. This means that the scintillator converts the electromagnetic radiation of any wavelength and frequency that the human eye (detectors) may not be sensitive to, into the radiation which is visible to the human eye (detectors). Most scintillators react to various forms of ionizing radiation.

The ability to absorb the electromagnetic radiation is characterised by the absorption spectra of substances and the ability to emit the electromagnetic radiation is characterised by the emission spectra of substances. To asses the absorption or emission spectra, or the absorption or emission bands in them, the maximum value is utilised that the individual bands achieve, and the full width at half maximum (FWHM) which is given by the difference between the two extreme values that are independently variable, at which the dependent variable is equal to half of its maximum value. Half width at half maximum (HWHM) equals half of FWHM.

The primary dominant time is the fastest amplitude-dominant component in the scintillator response, determined by the emission centre lifetime which is very close to the lifetime in the photoluminescent decay. The photoluminescent decay is measured at the direct excitation of the emission centre, typically in the ultraviolet spectrum region. The scintillation response practically always contains slower components, too, that originate as a result of energy transfer, mostly in the form of the charge carriers migration towards emission centres.

Scintillators are often utilised during detection and spectrometry of various forms of ionizing radiation. These detectors are frequently used in the area of research in nuclear and particle physics, in medicine or in industry for quality control. Many of these applications require a short scintillator decay time because it is directly proportional to the speed of the technical operation that the scintillator performs. The examples of technical operations where the scintillator decay time plays a critical role include patient's body scanning in PET, i.e. positron emission tomography, scanning objects at border control, detection of particles in studies in particle physics, scanning and imaging in electron microscopy and CT, crystallography and many others.

Currently, various types of single crystals are being used for the preparation of scintillation detectors. Depending on the requested applications, various physico-chemical, material and scintillation properties of the individual types of the single crystals are used, such as the density, effective atomic number, wavelength emission, luminescent lifetime and light yield.

In industry the materials based on aluminates have been in use for a long time, namely, the Yttrium Aluminium Garnet doped with $Ce^{3+}$ (YAG:Ce, $Y_3Al_5O_{12}$:Ce), Yttrium Aluminium Perovskite doped with $Ce^{3+}$ (YAP:Ce, $YAlO_3$:Ce) or Yttrium Silicate doped with $Ce^{3+}$ (YSO:Ce, $Y_2SiO_5$:Ce). Should a higher density and effective atomic number be required, the Y ion is completely or partially replaced with the Lu ion. The speed of detector scintillation response is limited by the response of the luminescence centre itself cerium ion, which is between 20-70 ns for these materials.

An example of a relatively fast scintillator which is frequently used is YAG:Ce. Although the utilization of this scintillator e.g. in electron microscopy has been known minimally since 1978 (R. Autrata, P. Schauer, Jos. Kvapil, J. Kvapil—"A single crystal of YAG—new fast scintillator in SEM"—Journal of Physics E 11, (1978) p. 707-708), this scintillator is still widely used. However, its scintillator decay time is 70 ns, which is relatively long. Consequently, this scintillator is more and more replaced with faster materials, such as YAP:Ce with the decay time of 25 ns, as described in the patent documentation CZ 275476.

YAP:Ce probably represents a limit material concerning the speed of decay time with cerium doped oxide materials (P. Dorenbos, Fundamental Limitations in the Performance of $Ce^{3+}$-, $Pr^{3+}$ and $Eu^{2+}$-Activated Scintillators. IEEE Trans. Nucl. Science 57 3 (2010) 1162-1167). It is given by the lifetime of the $Ce^{3+}$ luminescence centre and is furthermore influenced by the position symmetry of $Y^{3+}$ which $Ce^{3+}$ substitutes and by the intensity of crystalline field. In spite of this, even this value is not sufficient for some applications. For higher speed shorter decay time some applications use a material doped with praseodymium which has a shorter lifetime than that of cerium. An example includes the LuAG:Pr material from the U.S. Pat. No. 7,019,284 or LuYAG:Pr from the CZ300631 patent which has the decay time of approximately 20 ns. But even this value is not sufficient in some examples of usage.

Although there exist faster scintillators than these described above, such as $BaF_2$, $PbWO_4$ or ZnO, they do not find usage in real applications because they provide too low amount of light, i.e. small number of photons per 1 MeV of absorbed energy of ionizing radition. Therefore most efforts are focused on the modification of the above described materials.

In optimized material compositions in single crystal scintillators of the above stated type, a focused co-doping has been used with optically inactive ions with a charge different from the original cation which they replace. Co-doping with the $Ca^{2+}$ and $Mg^{2+}$ ions is often used (M. Nikl, A. Yoshikawa, *Recent R&D trends in inorganic single crystal scintillator materials for radiation detection*. Adv. Opt. Mater. 3, 463-481 (2015)). Such ions do not participate in the scintillation process itself as they are neither able to catch migrating charges, nor participate as luminescence centres. These strategies result in suppressing the slower components in the scintillation response which originated due to the transport of electrons and holes towards the luminescence centres. This achieves faster scintillation response and the light yield and/or requested scintillator luminosity are preserved or even increased.

The WO 2014/197099 A2 patent application describes a scintillator composed of yttrium-aluminium garnet doped with metal (YAG:M), when the general formula of the phosphor is $Y_{3-x}M_xAl_{5+y}O_{12+z}$ and stoichiometric coefficients x, y and z are in various ranges. At the same time, the molar ratio Y:Al is between 1.5:2.5 and 1.5:2.75 and between Y:M it is 1.5:0.0015 and 1.5:0.15, this phosphor composition is not stoichiometric. The M letter represents a metal from the Ce, Pr, Nd, Pm, Sm, Eu, Gd, Tb, Dy, Ho, Er, Tm, Yb, Cr and Lu group.

Another example of a patent that modifies the known garnet structure YAG:Ce is the U.S. Pat. No. 8,969,812 patent. This patent replaces in the atom crystalline structure the aluminium atom with gallium and the yttrium, lutecium or ytterbium atoms with gadolinium. The resulting scintillator is described with a chemical formula $Gd_{3-x-y}Ce_xRE_yAl_{5-z}Ga_zO_{12}$. X then lies in the range of 0.0001 to 0.15, y in the range between 0 to 0.1 and z in the range between 2 to 4.5. RE are the elements Y, Yb or Lu. This scintillator emits at the wavelength of 530 nm and its decay time depends on various chemical compositions and relations between the individual elements. This scintillator can be used for a whole range of applications, such as positron emission tomography.

The U.S. Pat. No. 7,405,404 B1 patent document describes the invention—a new scintillator ($CeBr_3$) for gamma rays spectroscopy. The scintillator single crystals are prepared with the Bridgman process. In $CeBr_3$ the trivalent cerium cation ($Ce^{3}\pm$) represents the inner luminescent centre for the scintillation process. The crystals have a high light yield and a fast scintillation response. In other design the lutetium in $LuBr_3$ or lanthan in $LaBr_3$ may be utilised. Other dopants may include Eu, Pr, Sr, Ti, Cl, F, I. The dopant is present in the amount ranging from 0.1% to 100%.

However, there exist such applications which require ever higher acceleration of scintillation response with a lower but still significant scintillation yield. These include applications from the area of internal material structure quality control. The task of the submitted invention is to find the method of greater acceleration of scintillation response of the scintillator than in the known scintillators. The task of the invention is also to find the scintillator material, suitable for the application of this method.

SUMMARY OF THE INVENTION

The set task is solved by creating the method of shortening the scintillation response of scintillator luminescence centres and creating a scintillator material with the shortened scintillation response according to this invention.

The invention concerns a scintillator which contains at least one dopant from the Ce, Pr group creating luminescent centres.

The summary of the invention comprises the fact that after the excitation of the electrons of the luminescent centres as a result of absorbed electromagnetic radiation, a portion of energy from the excited luminescent centres is taken away via a non-luminescent process which results in the shortening of the time of duration of amplitude-dominant component of the scintillation response.

In one preferred embodiment of the method of shortening the scintillation response of a scintillator according to this invention, the taking away of a part of energy in the non-radiative transfer is performed by the inserting of minimally one type of the first co-dopant in the structure of the scintillator material. FWHM range of the co-dopant absorption band is in the extent of ±HWHM from the wavelength of the dopant emission band maximum where HWHM is half width at half maximum of the emission band.

In this method of shortening the scintillation response of a scintillator according to the invention, the first co-dopant is preferably from the group of lanthanoids, 3d transition metals, 4d transition metals or $5s^2$ ($In^+$, $Sn^{2+}$, $Sb^{3+}$) or $6s^2$ ($Tl^+$, $Pb^{2+}$, $Bi^{3+}$) ions. Co-doping with these ions shortens the photoluminescence response and shortens too the scintillations response in its main, dominating component. Consequently, the light yield is being decreased in the same ratio as the measured photoluminescence lifetime is being shortened, which results in accelerated scintillation response.

In another preferred embodiment of the method of reducing the scintillation response of a scintillator according to this invention, minimally one second co-dopant from the group of optically inactive ions is inserted in the structure of the scintillator material. In this preferred execution the dominant component of the scintillation response is accelerated and the intensity of slower secondary components of the scintillation response is decreased at the same time. In the preferred execution the second co-dopant is the $Mg^{2+}$ or $Ca^{2+}$ cation.

In another preferred embodiment of the method of shortening the scintillation response of a scintillator according to this invention, the taking away of a part of energy in the non-radiative transfer is performed by increasing the material temperature above the threshold value of the thermal quenching of luminescence centres, that is above the temperature when the intensity and luminescence lifetime of the emitted radiation drops to one half.

The summary of the invention is also the scintillator material based on garnet with a general chemical formula $A_3B_5O_{12}$ which corresponds to the general chemical formula $A_{3-x1-x2}{}^1M_{x1}{}^2M_{x2}B_5O_{12}$ where substituent A is represented by a cation from the $Y^{3+}$, $Lu^{3+}$, $Gd^{3+}$ group or their mixture, substituent B is represented by a cation from the $Al^{3+}$, $Ga^{3+}$, $Sc^{3+}$, $Mo^{3+}$ group or their mixture, substituent $^1M$ represents the dopant cation from the $Ce^{3+}$ or $Pr^{3+}$ group and substituent $^2M$ represents the first codopant cation from the Nd, Sm, Eu, Tb, Dy, Ho, Er, Tm lanthanoids group or from the Ti, V, Cr, Mn, Fe, Co, Ni, Cu 3d transition metals group or from the Zr, Nb, Mo, Ru, Rh, Ag 4d transition metals group or from the Ta, W 5d transition metals group or from the $5s^2$ In, Sn, Sb ions group or from the $6s^2$ Tl, Pb, Bi ions group.

In another preferred execution the substituent $^2M$ represents a mixture of the first co-dopant and the second co-dopant where the second co-dopant is from the group of optically inactive ions, $Mg^{2+}$ or $Ca^{2+}$ cation.

The summary of the invention is also the scintillator material based on perovskite with a general chemical formula $ABO_3$ which corresponds to the general chemical formula $A_{1-x1-x2}{}^1M_{x1}{}^2M_{x2}BO_3$ where substituent A is represented by a cation from the $Y^{3+}$, $Lu^{3+}$, $Gd^{3+}$ group or their mixture, substituent B is represented by a cation from the $Al^{3+}$, $Ga^{3+}$, $Sc^{3+}$, $Mo^{3+}$ group or their mixture, substituent $^1M$ represents the dopant cation from the $Ce^{3+}$ or $Pr^{3+}$ group and substituent $^2M$ represents the first codopant cation from the lanthanoids group, 3d transition metals, 4d transition metals, 5d transition metals group or $5s^2$ or $6s^2$ ions.

In the preferred embodiment the substituent $^2M$ represents the first co-dopant from the Nd, Sm, Eu, Tb, Dy, Ho, Er, Tm lanthanoid group or from the Ti, V, Cr, Mn, Fe, Co, Ni, Cu 3d transition metals or from the Zr, Nb, Mo, Ru, Rh, Ag 4d transition metals or from the Ta, W 5d transition metals or from the 5s² In, Sn, Sb ion group or from the 6s² Tl, Pb, Bi ion group.

The summary of the invention is also the scintillator material based on silicate with a general chemical formula $A_2SiO_5$ which corresponds to the general chemical formula $A_{2-x1-x2}{}^1M_{x1}{}^2M_{x2}SiO_5$ where substituent A is represented by a cation from the $Y^{3+}$, $Lu^{3+}$, $Gd^{3+}$ group or their mixture, substituent $^1M$ represents the dopant cation from $Ce^{3+}$ or $Pr^{3+}$ group and substituent $^2M$ represents the first codopant cation from the lanthanoids group, 3d transition metals, 4d transition metals, 5d transition metals group or 5s² or 6s² ions.

In the preferred embodiment the substituent $^2M$ represents the first co-dopant from the Nd, Sm, Eu, Tb, Dy, Ho, Er, Tm lanthanoid group or from the Ti, V, Cr, Mn, Fe, Co, Ni, Cu 3d transition metals or from the Zr, Nb, Mo, Ru, Rh, Ag 4d transition metals or from the Ta, W 5d transition metals or from the 5s² In, Sn, Sb ion group or from the 6s²Tl, Pb, Bi ion group.

In another preferred execution the substituent $^2M$ represents a mixture of the first co-dopant and the second co-dopant where the second co-dopant is from the group of optically inactive ions, $Mg^{2+}$ or $Ca^{2+}$ cation.

The advantages of the invention may include the reducing of the scintillation response time of the scintillator, especially the acceleration of the scintillation response dominant component which is given by the luminescence centre itself whereas a high scintillation yield does not necessarily have to be preserved.

DESCRIPTION OF THE DRAWINGS

The invention shall be clarified more closely in the following drawings, where.

EXAMPLES OF THE PREFERRED
EMBODIMENTS OF THE INVENTION

It is understood that the below stated and depicted specific examples of the invention execution are represented for illustration and not as the limitation of the invention to the stated examples. Experts knowledgeable of the state of technology will find or will be able to ensure, when performing routine experimentation, larger or smaller amount of equivalents to the specific executions of the invention which are described here. These equivalents shall be also included in the extent of the following patent claims.

Active scintillators may be prepared in the form of powder, such as via simple sintering, of an active layer, such as via epitaxial growth or plasma deposition, or of a volume single crystal, such as with the Czochralski, EFG, microPD, Kyropoulos and other methods.

Figure 1:
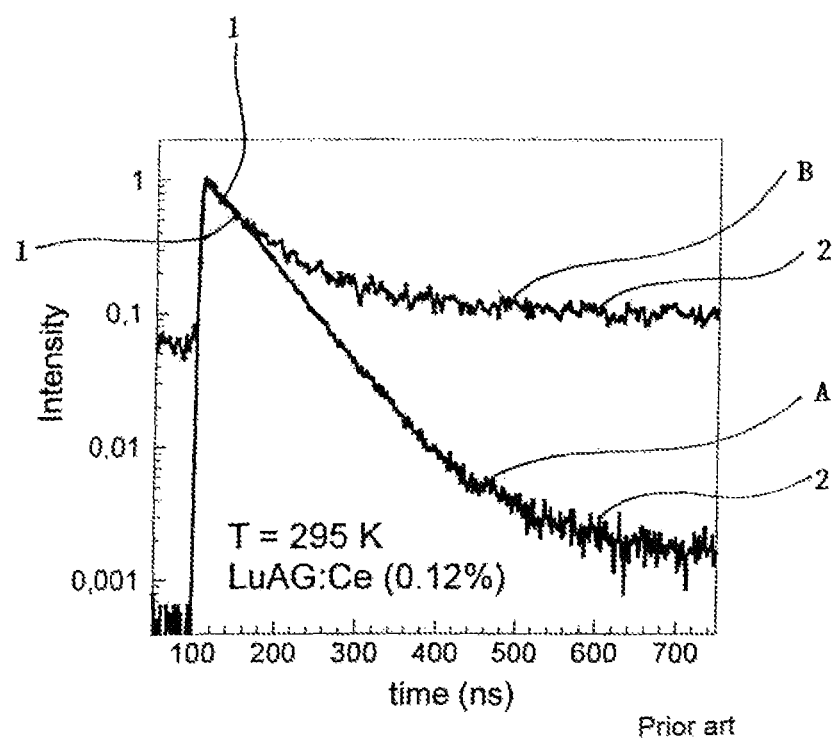
FIG. 1 illustrates a graph with the A curve of the $Ce^{3+}$ luminescence centre time response in the LuAG:Ce scintillator and with the B curve of scintillation response of the LuAG:Ce.
Figure 2:
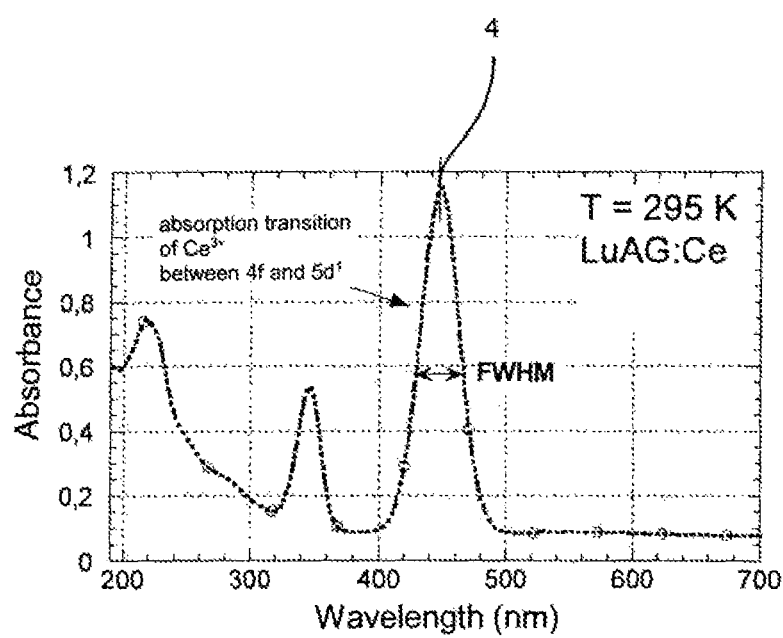
FIG. 2 illustrates a graph of absorption spectrum with marked maximum and half width of absorption band of the respective $Ce^{3+}$ centre in the LuAG:Ce scintillator.
Figure 3:
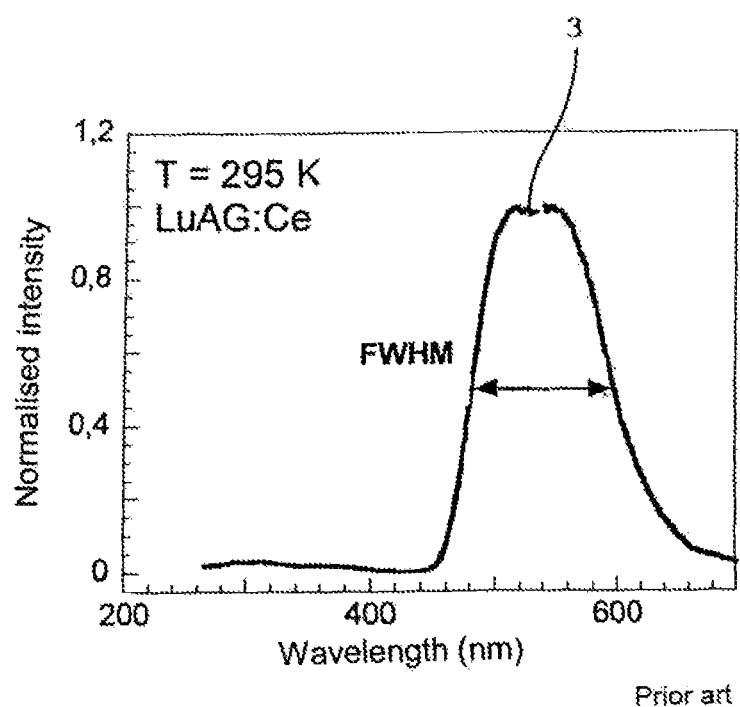
FIG. 3 illustrates a graph of luminescence spectrum with marked maximum and half width of emission band of the $Ce^{3+}$ centre in the LuAG:Ce scintillator.

The scintillation response mechanism with known materials is schematically illustrated in FIGS. 1-3 with the example of the LuAG:Ce garnet material. $Ce^{3+}$ is used as a dopant here. In FIG. 1, the A curve represents the response of the $Ce^{3+}$ centre which is excited directly with photons of the 450 nm wavelength, the B curve represents the scintillation response of the $Ce^{3+}$ centre which is excited with ionizing radiation, i.e. gama photons with the 511 keV energy. In the scintillation response, there is marked the amplitude-dominant fast component 1, which is determined by the emission centre lifetime and where the A and B curves are practically identical, and the following amplitude-minor slow component 2 of the scintillation response arising as a result of the migration of charge carriers to the $Ce^{3+}$ centres.

FIG. 2 illustrates a graph of absorption spectrum of the same material, i.e. LuAG:Ce, with marked maximum 4 of the absorption band and width in the half of absorption band maximum related to the $Ce^{3+}$ centre in the LuAG:Ce scintillator. This width is designated as half width FWHM. The graph depicts the dependence of absorbance on the wavelength with marked absorption transition of $Ce^{3+}$ between the 4f and 5d¹ levels.

FIG. 3 illustrates a graph of luminescence spectrum with marked maximum 3 of the emission band and half width of emission band (FWHM) related to the $Ce^{3+}$ centre in the LuAG:Ce scintillator, depicting the dependence of normalised intensity on the wavelength.

FIG. 1 clearly shows that the scintillation response of known scintillators is long also due to the long duration time of the amplitude-dominant component of the scintillation response. This time is significantly shortened in materials according to the following examples of invention execution:

Example 1—Preparation of Sample of YAG:Ce,
YAG:Nd a YAG:Ce Single Crystal Co-Doped with
Nd (YAG:Ce, Nd)

Mixtures were prepared of $Y_2O_3$ and $Al_2O_3$ binary oxides with the $Y_3Al_5O_{12}$ composition, $CeO_2$ and $Al_2O_3$ with the $Ce_3Al_5O_{12}$ composition, $Nd_2O_3$ and $Al_2O_3$ of the $Nd_3Al_5O_{12}$ composition when the used materials were of the 5N purity. Mechanical mixing was followed with homogenisation via shaking and isostatic pressing into a block. The blocks were sintered at 1 400° C. for the period of 24 hours in the air and subsequently were partially crushed and inserted into a molybdenum crucible. The YAG:Ce, YAG:Nd and YAG:Ce, Nd single crystals were grown from the mixture via the Czochralski method under a protective hydrogen/argon atmosphere. The composing of melt for growing was selected in such a method that the resulting crystals are of the $Y_{2.96}Nd_{0.04}Al_5O_{12}$) $Y_{2.91}Nd_{0.04}Ce_{9.95}Al_5O_{12}$ a $Y_{2.95}Ce_{0.05}Al_5O_{12}$ composition to compare their characteristics.

Small discs were cut from the prepared single crystals of 1 mm thickness and 10 mm diameter which were optically polished for the subsequent measurement of the spectra and scintillation responses.

Figure 4:
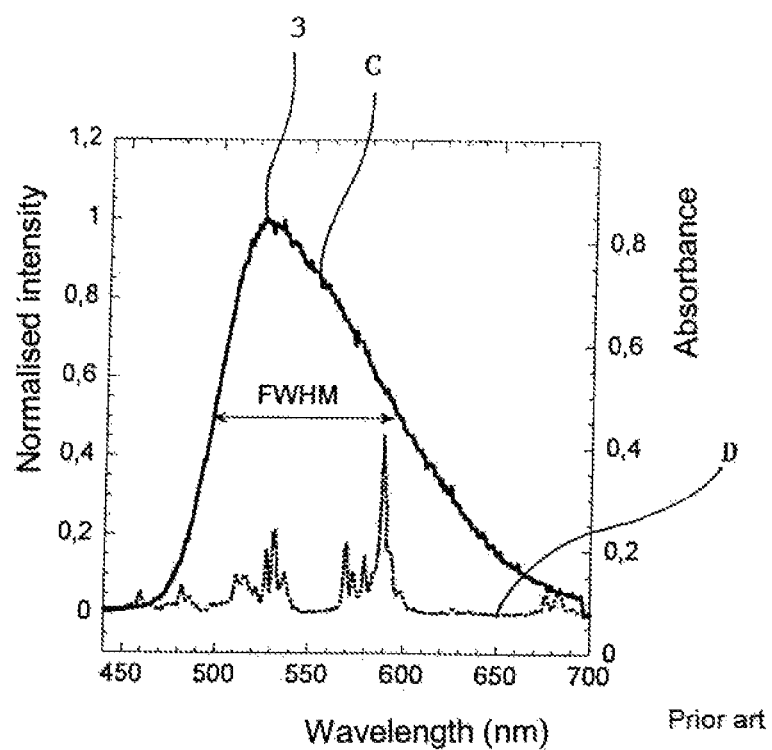
FIG. 4 illustrates scintillation spectrum of the YAG:Ce single crystal (C curve) with marked half width of emission band and absorption spectrum of the YAG:Nd single crystal (D curve)
Figure 5:
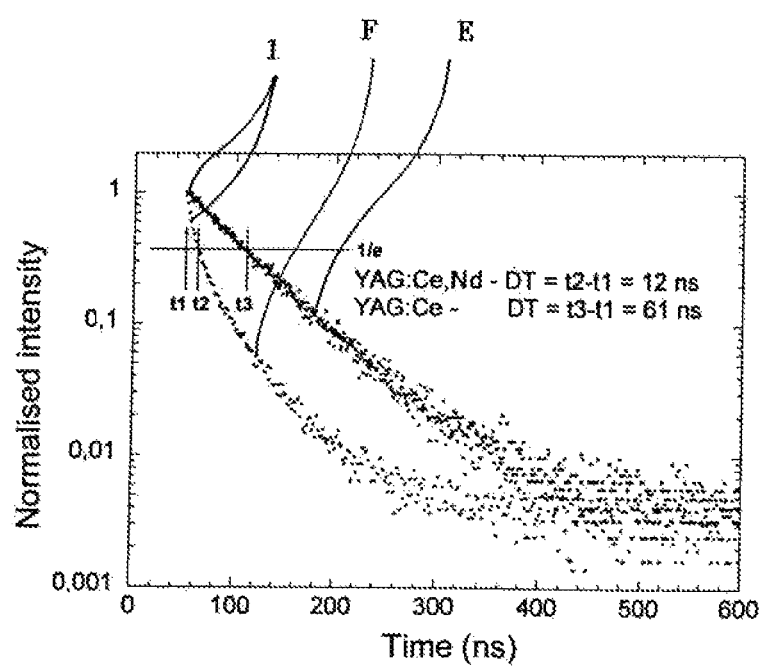
FIG. 5 illustrates scintillation response of crystals and YAG:Ce (E curve) and YAG:Ce, Nd (F curve)

FIG. 4 illustrates with the C and D curves the overlap of the emission band of the $Ce^{3+}$ centre of the YAG:Ce crystal with marked maximum 3 at 525 nm and absorption transitions of the centre $Nd^{3+}$ $^4I_{9/2} \rightarrow {}^4G_{5/2}, {}^4G_{7/2}$ (W. T. Carnal) et al, J. Chem. Phys. 90, no. 7, 3443, 1989) in the spectrum range of 500-595 nm which corresponds to FWHM of the $Ce^{3+}$ centre emission, utilizing X-ray radiation with the voltage on the X-ray tube of 40 kV. This overlap causes a non-radiative energy transfer from the $Ce^{3+}$ centre to the $Nd^{3+}$ centre which results in the acceleration of the amplitude-dominant component 1 in the scintillator response that is depicted in FIG. 5, where the E curve illustrates the scintillation response of the common YAG:Ce material and the F curve illustrates the scintillation response of the YAG:Ce material co-doped with Nd as the first co-dopant. Both the materials were exposed to gamma radiation with the photon energy 511 keV from the radioisotope $^{22}Na$. For the purposes of quantitative assessment of the scintillation response shortening, the 1/e life time, denoted in FIG. 5, is standardly introduced. The life time is the time of duration from which the signal drops from the maximum amplitude 1 to 1/e, where e is the base of the natural logarithm, e=2.718 in time t1, t2 and t3. The life time of the YAG:Ce, Nd F crystal is shortened to 12 ns in comparison with 61 ns of the YAG:Ce material E, that is more than four times.

Example 2 Preparation of Sample of YAG:Ce Single Crystal Co-Doped with Ho (YAG:Ce, Ho)

In the total amount of 5 g, the $Y_2O_3$, $Al_2O_3$, $CeO_2$ and $Ho_2O_3$ binary oxides of the 5N purity were mixed in the ratio of the chemical $Y_{2.91}Ho_{004}Ce_{005}Al_5O_{12}$ formula. After mechanical mixing and grinding in the grinding mortar there followed a two-stage sintering: in the first stage at 1 300° C. for the period of 24 hours, in the second stage at 1 400° C. for the period of 24 hours, in the air. The material was again mechanically ground in the grinding mortar between the individual steps. The powder was inserted into a molybdenum crucible and in the protective atmosphere of 70% argon/30% hydrogen a single crystal was drawn in the shape of a rod with the EFG method through a molybdenum die. The $Y_{2.96}Nd_{0.04}Al_5O_{12}$ and $Y_{2.95}Ce_{0.05}Al_5O_{12}$ single crystals were prepared in the same method to compare their characteristics. Small discs of 1 mm thickness were cut from the prepared single crystal rods of 4 mm diameter which were optically polished for the subsequent measuring of spectra and scintillation responses.

Figure 6:
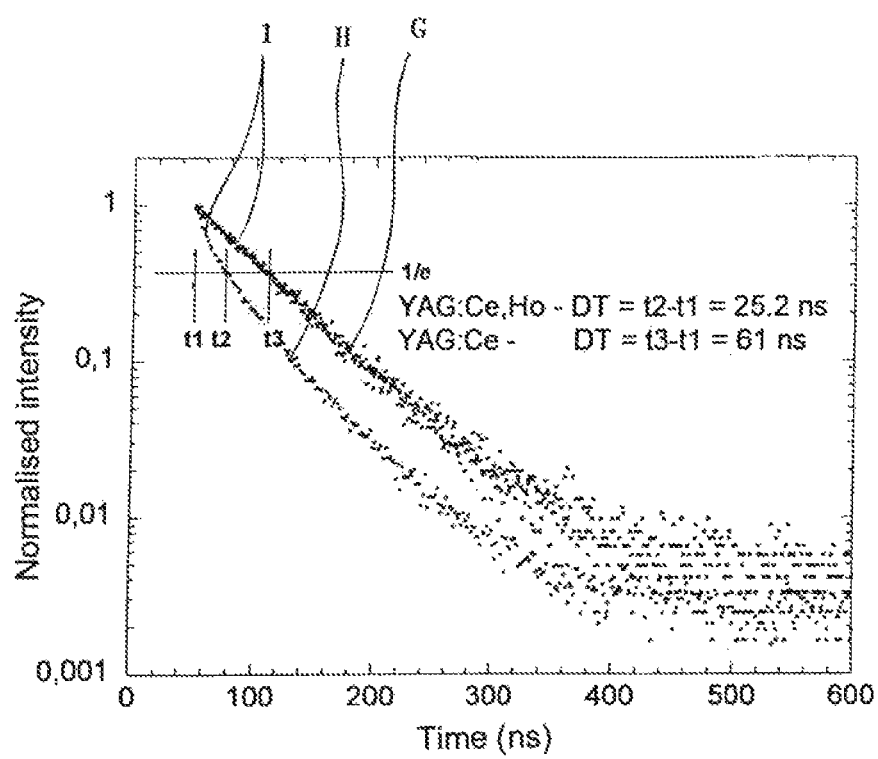
FIG. 6 illustrates scintillation response of crystals YAG:Ce (G curve) and YAG:Ce, Ho (H curve)

The overlap of the emission band of the $Ce^{3+}$ centre with maximum at 525 nm and absorption transition of the centre $Ho^{3+}$ $^5I_8 = {}^5S_2, {}^5F_4$ centre with the maximum at 530-540 nm (W. T. Carnal) et al, J. Chem. Phys. 90, no. 7, 3443, 1989) in the spectrum range of 500-595 nm which corresponds to FWHM of the $Ce^{3+}$ centre emission, causes the acceleration of the amplitude-dominant component of the scintillator response which is depicted in FIG. 6, where the G curve illustrates the scintillation response of the common YAG:Ce material and the H curve illustrates the scintillation response of the YAG:Ce material co-doped with Ho as the first co-dopant. Both the materials were exposed to gamma radiation of the photon energy 511 keV from the radioisotope $^{22}Na$. FIG. 6 depicts the life time t3 of the YAG:Ce crystal with the G curve and life time t2 of the YAG:Ce, Ho with the H curve which is shortened to 25.2 ns in comparison with 61 ns of the YAG:Ce material, that is more than twice. Time t1 represents the start of the experiment.

Example 3 Preparation of Sample of YAP:Pr Single Crystal and YAP:Pr Single Crystal Co-Doped with Gd (YAP:Pr, Gd)

The YAP:Pr and YAP:Pr, Gd single crystals were prepared and grown analogously according to Example 2 when the $Y_2O_3$, $Al_2O_3$, $Gd_2O_3$ and $Pr_8O_{11}$ binary oxides of the 5N purity were mixed in the ratio of the $Y_{0.995}Pr_{0.005}AlO_3$, $Y_{0.985}Gd_{0.01}Pr_{0.005}AlO_3$ and $Y_{0.945}Gd_{0.05}Pr_{0.005}AlO_3$ chemical formulas. The spectra and scintillation responses were measured analogously as in Example 2.

Figure 7:
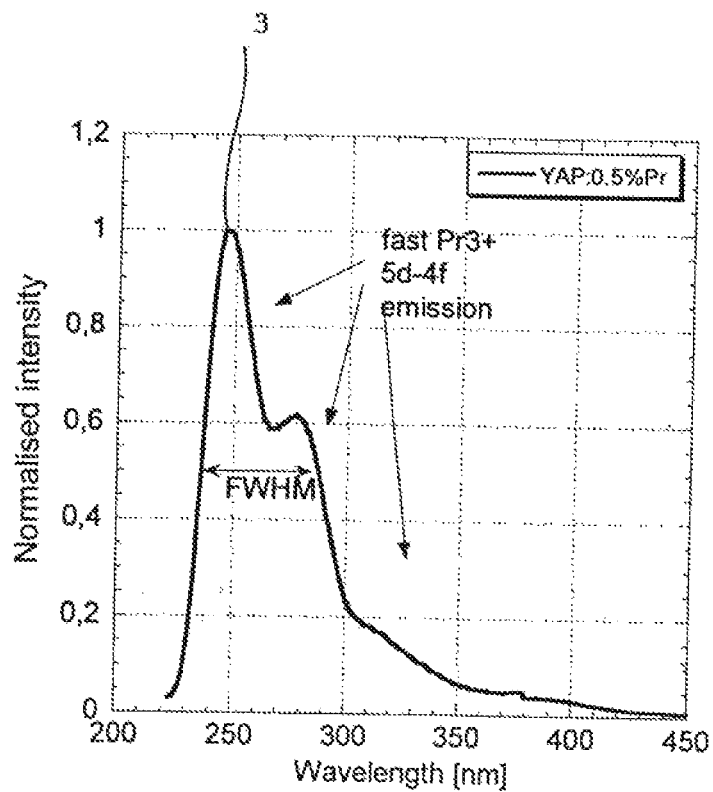
FIG. 7 illustrates scintillation spectrum of the YAP:Pr crystal with marked half width of emission band.

FIG. 7 illustrates the emission band of the $Pr^{3+}$ centre with marked maximum 3 at 247 nm and full width at half maximum (FWHM) related to the $Pr^{3+}$ centre in the YAP:Pr scintillator.

Figure 8:
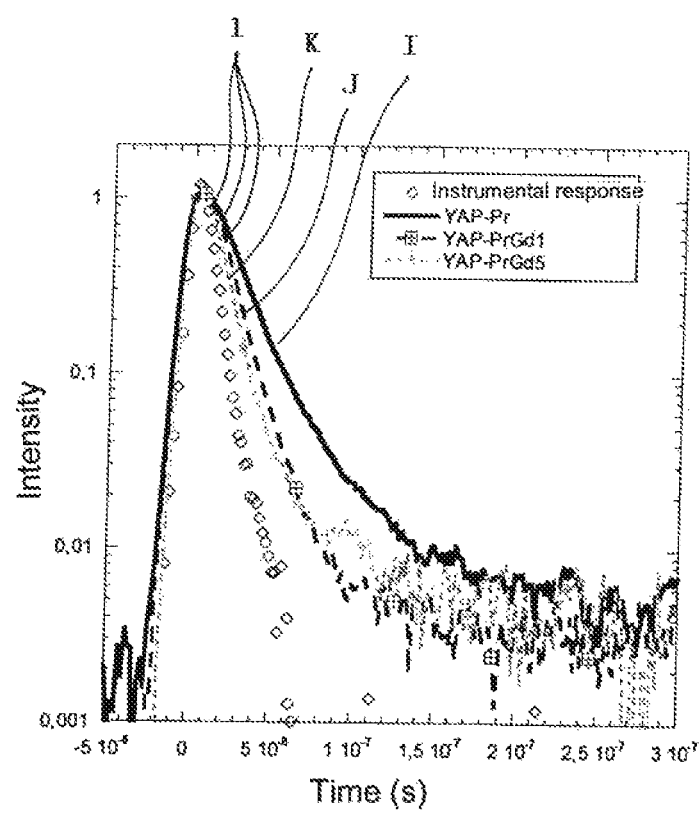
FIG. 8 illustrates scintillation response of crystals YAP:Pr (I curve) and YAP:Pr, Gd (J curve and K curve)

The overlap of the emission band of the $Pr^{3+}$ centre with absorption transition of the centre $Gd^{3+}$ $^8S_{7/2} \rightarrow {}^6I_x$ at 270-275 nm (W. T. Carnal) et al, J. Chem. Phys. 90, no. 7, 3443, 1989) in the spectrum range of 235-285 nm which corresponds to FWHM of the $Pr^{3+}$ centre emission, causes a non-radiative energy transfer from the $Pr^{3+}$ centre to the $Gd^{3+}$ centre which results in the acceleration of the amplitude-dominant component 1 in the scintillator response which is depicted in FIG. 8. The YAP:Pr and YAP:Pr, Gd single crystals were exposed to gamma radiation of the photon energy 511 keV from the radioisotope $^{22}Na$. The life time of the amplitude-dominant component of the YAP:Pr, Gd single crystal is shortened in comparison with 16 ns of the YAP:Pr material, depicted with the I curve, to 11 ns for the YAP:Pr material co-doped with Gd (1% wt.) depicted with the J curve, and to 7 ns for the YAP:Pr material co-doped with Gd (5% wt.) depicted with the K curve. The life times were calculated from the convolution of the instrumental response (stated in FIG. 8) with a double exponential function.

Example 4 Preparation of Sample of YAP:Pr Single Crystal and YAP:Pr Single Crystal Co-Doped with Tb (YAP:Pr, Tb)

The YAP:Pr and YAP:Pr co-doped with Tb single crystals were prepared and grown analogously according to Example 1. A mixture of $Y_2O_3$ and $Al_2O_3$ binary oxides was prepared with the ratio 1:1. Mechanical mixing was followed with homogenisation shaking and isostatic pressing into a block. The blocks were sintered at 1 400° C. for the period of 24 hours in the air and subsequently were partially crushed and inserted into a tungsten crucible. To complete stoichiometry, the $Al_2O_3$, $Tb_4O_7$ and $Pr_6O_{11}$ oxides were used with materials of the 4N purity. Single crystal with $Y_{0.995}Pr_{0.005}AlO_3$, $Y_{0.985}Tb_{0.01}Pr_{0.005}AlO_3$ and $Y_{0.945}Tb_{0.05}Pr_{0.005}AlO_3$ chemical formulas were prepared from the stated materials. The spectra and scintillation responses were measured analogously as in Example 1.

Figure 9:
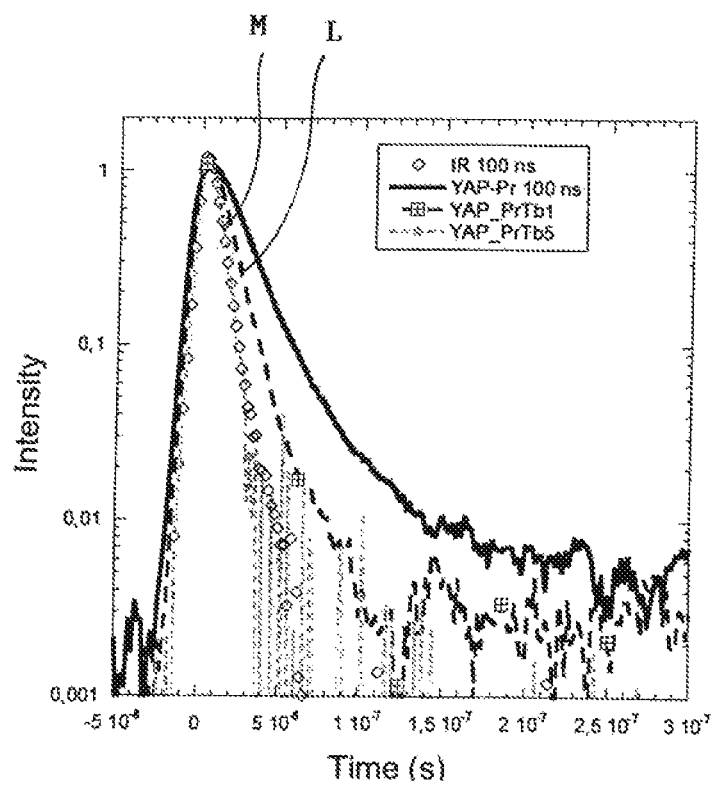
FIG. 9 illustrates scintillation response of crystals YAP:Pr (identical with I curve in FIG. 8) and YAP:Pr, Tb (M curve and L curve)

The overlap of the emission band of the $Pr^{3+}$ centre with maximum at 247 nm and the lowest absorption band transition 4f-5d of the $Tb^{3+}$ centre in range of 250-280 nm (K. S. Sohn et al, *J. Electrochem. Soc.*, 147 (9) 3552, 2000) in the spectrum range of 235-285 nm which corresponds to FWHM of the $Pr^{3+}$ centre emission, causes a non-radiative energy transfer from the $Pr^{3+}$ centre to the $Tb^{3+}$ centre which results in the acceleration of the amplitude-dominant component 1 in the scintillator response. It is depicted in FIG. 9. The YAP:Pr and YAP:Pr, Tb single crystals were exposed to gamma radiation of the photon energy 511 keV from the radioisotope $^{22}Na$. The life time of the amplitude-dominant component of the YAP:Pr, Tb single crystal is shortened in comparison with 16 ns of the YAP:Pr material, depicted with the I curve from Example 3, to 11 ns for the YAP:Pr material co-doped with Td (1% wt.) depicted with the L curve, and to less than 1 ns for the YAP:Pr material co-doped with Tb (5% wt.) depicted with the M curve. The life times were calculated from the convolution of the instrumental response (shown in FIG. 9) with a double exponential function.

Example 5 Preparation of Sample of LGSO:Ce Single Crystal and LGSO:Ce Single Crystal Co-Doped with Dy (LGSO:Ce, Dy)

The LGSO:Ce and LGSO:Ce co-doped with Dy single crystals were prepared and grown with the Czochralski method from iridium crucible under the protective atmosphere of nitrogen with traces of oxygen. The starting materials for growing the single crystal analogously according to Example 1 were the $Lu_2O_3$ and $SiO_2$, $Gd_2O_3$ and $SiO_2$, $CeO_4$ and $SiO_2$ and $Dy_2O_3$ and $SiO_2$ binary oxides mixtures with the purity of 5N. The result of growth were the single crystals of the $(Lu_{0.53}Gd_{0.40}Ce_{0.01})_2SiO_5$, and $(Lu_{0.57}Gd_{0.40}Ce_{0.01}Dy_{0.02})_2SiO_5$ chemical formulas. The spectra and scintillation responses were measured analogously as in Example 1.

Figure 10:
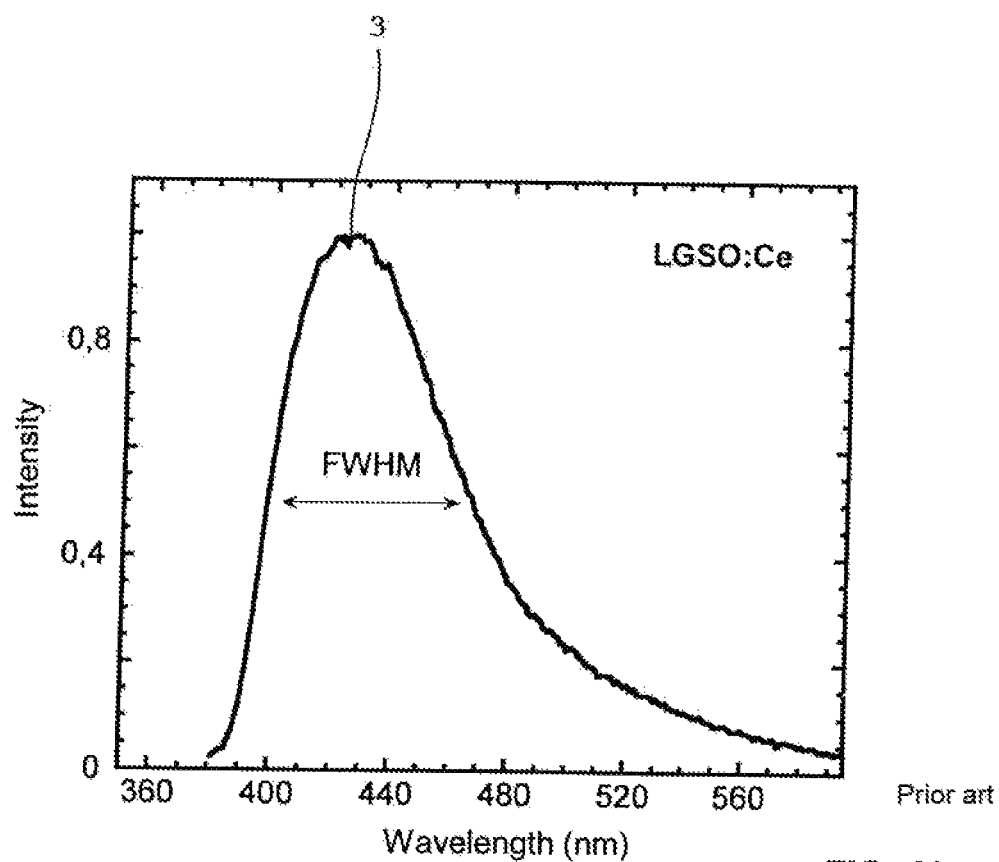
FIG. 10 illustrates scintillation spectrum of crystal LGSO:Ce with marked half width of emission band.
Figure 11:
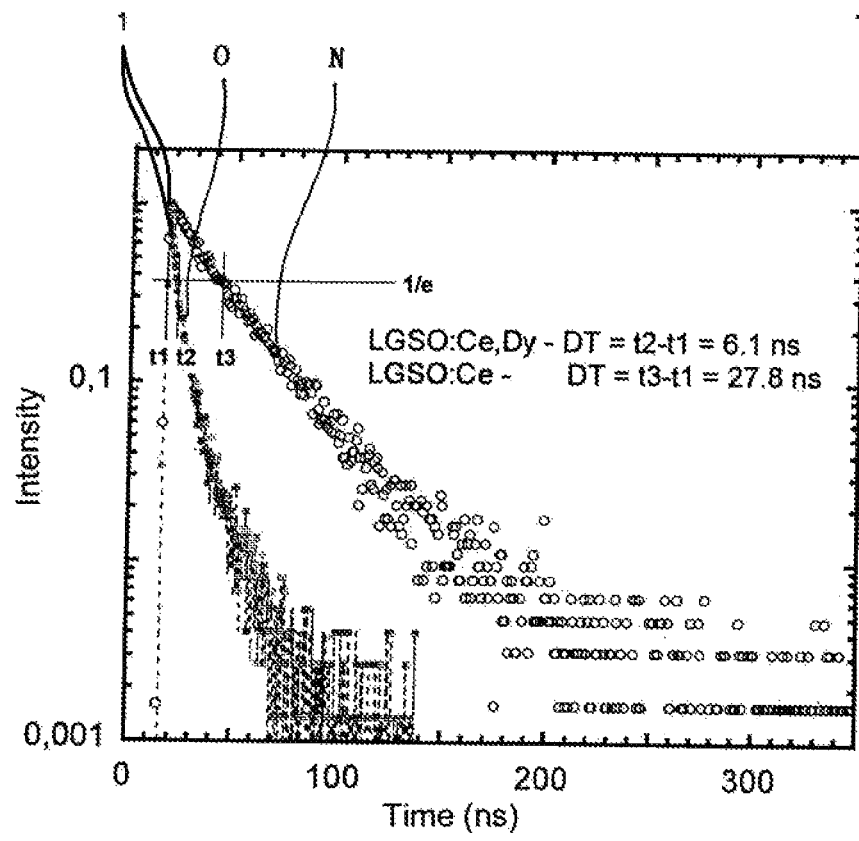
FIG. 11 illustrates scintillation response of crystals LGSO:Ce (N curve) and LGSO:Ce, Dy (O curve)

The overlap of the emission band of the $Ce^{3+}$ centre with marked maximum 3 at 425 nm and FWHM 400-465 nm and absorption transitions 4f-4f from the basic state of $^6H_{15/2}$ to higher 4f states $^4I_{15/2}$ and $^4G_{1/12}$ and $^4M_{21/2}$ of the $Dy^{3+}$ centre in the range of 400-455 nm (W. T. Carnal) et al, *J. Chem. Phys.* 90, no. 7, 3443, 1989), which is depicted in FIG. 10, causes a non-radiative energy transfer from the $Ce^{3+}$ centre to the $Dy^{3+}$ centre which results in the acceleration of the amplitude-dominant component 1 of the scintillator response. It is depicted in FIG. 11, where the N curve illustrates the scintillation response of the common LGSO:Ce material and the 0 curve illustrates the scintillation response of the LGSO:Ce material co-doped with Dy as the first co-dopant. Both the materials were exposed to gamma radiation of the photon energy 511 keV from the radioisotope $^{22}Na$. The life time t2 of the amplitude-dominant component of the LGSO:Ce crystal, co-doped with Dy, 2% wt. 0 is shortened when compared with the life time t3 of 27.8 ns of the material LGSO:Ce N to 6.1 ns, that is more than four times. Time t1 represents the start of the experiment.

Example 6—Preparation of Sample of YSO:Ce Single Crystal

The YSO:Ce single crystal was prepared and grown analogously according to Example 4. The $Y_2O_3$, $SiO_2$ and $CeO_4$ binary oxides of 5N purity were mixed which resulted in a single crystal of the $(Y_{0.99}Ce_{0.01})_2SiO_5$ chemical formula. The spectra and scintillation responses were measured analogously as in Example 1.

Figure 12:
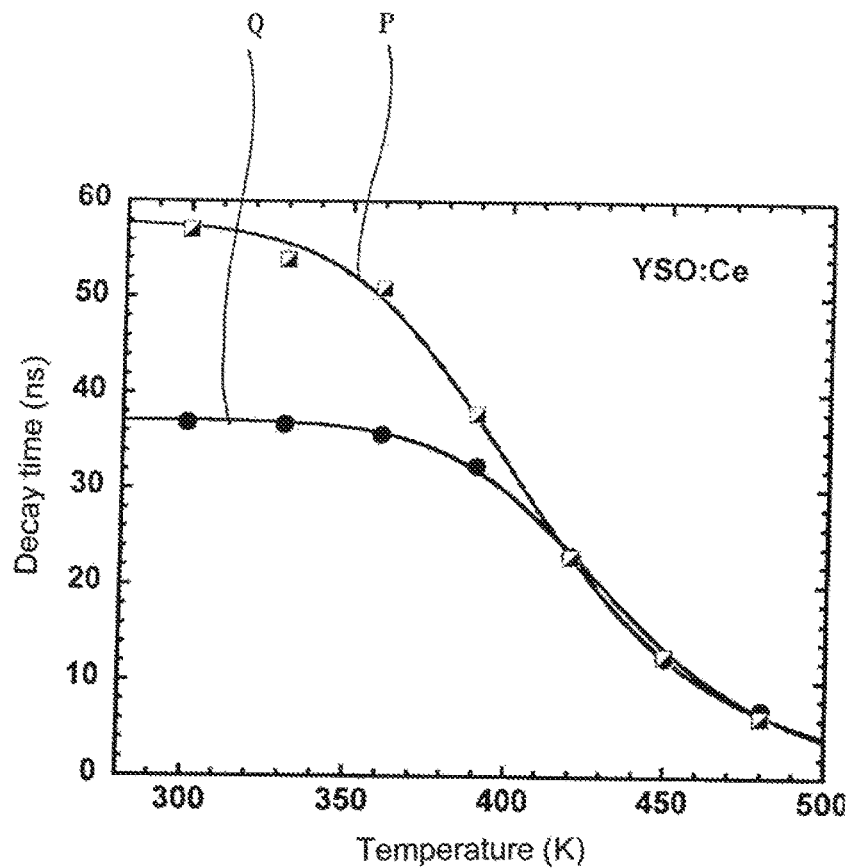
FIG. 12 illustrates thermal dependence of photoluminescence decay time of centres depicted by the P curve and Q curve in the YSO:Ce crystal.
Figure 13:
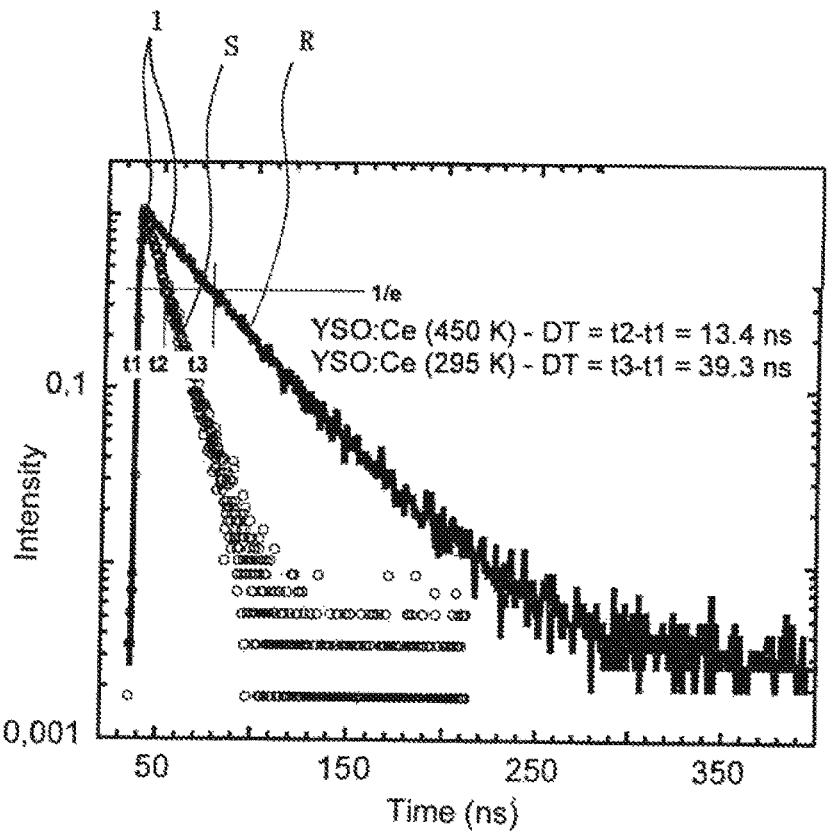
FIG. 13 illustrates scintillation response of crystals YSO:Ce for temperatures of 295 K (R curve) and 450 K (S curve)

A sufficient increase in temperature leads practically with every luminescence centre to the appearance of non-radiative thermal quenching of luminescence which can be utilized, too, for the shortening of the period of duration of the dominant component 1 in the scintillation response. In case of the emission band of both the $Ce^{3+}$ centres, marked here as the P curve and the Q curve, in the host YSO crystal, the thermal quenching of both the P and Q centres occurs at approximately 350 K, as shown in FIG. 12. Around 90% of all cerium emission centres have maxima of emission at 400 nm, these emission centres are represented with the 0 curve, the P curve represents minor cerium emission centres with the emission maximum at 490 nm. FIG. 13 illustrates how the dominant component 1 in the scintillation response at 450 K is shortened approximately three times when compared to the room temperature, when YSO:Ce crystals were excited by gamma radiation of the photon energy 511 keV from the radioisotope $^{22}Na$. For the purposes of quantitative assessment of the scintillation response shortening, the 1/e life time is introduced as well as in all the previous examples. Life time t3 is 39.3 ns at room temperature (295 K) and life time t2 is 13.4 ns at 450 K, as is illustrated with the R curve (295 K) and Q curve (450 K) in FIG. 13. Time t1 represents the start of the experiment.

It is clear from Examples 1 to 6 that the utilization of the first co-dopant results in a significant acceleration in the time of duration of amplitude-dominant component of the scintillation response. The scintillation response consists also of slower components where it is possible to decrease intensity. This simultaneous action occurs with materials according to the following example of invention execution:

Example 7—Preparation of Sample of Single Crystals LuAG:Ce and LuAG:Ce Co-Doped with Nd and LuAG:Ce Doubly Co-Doped with Nd and Mg (LuAG:Ce, Nd and LuAG:Ce, Nd, Mg)

The LuAG:Ce and LuAG:Ce co-doped with Nd and LuAG:Ce doubly do-doped with Nd and Mg single crystals were prepared and grown analogously according to Example 2 when the $Lu_2O_3$, $Al_2O_3$, $CeO_2$, $Nd_2O_3$ and MgO binary oxides of 5N purity were mixed in the ratio of the $Lu_{2.91}Nd_{0.02}Ce_{0.05}Mg_{0.02}Al_5O_{12}$ and $Lu_{2.93}Nd_{0.02}Ce_{0.05}Al_5O_{12}$ and $Lu_{2.95}Ce_{0.05}Al_5O_{12}$ chemical formulas. The spectra and scintillation responses were measured analogously as in Example 2.

Figure 14:
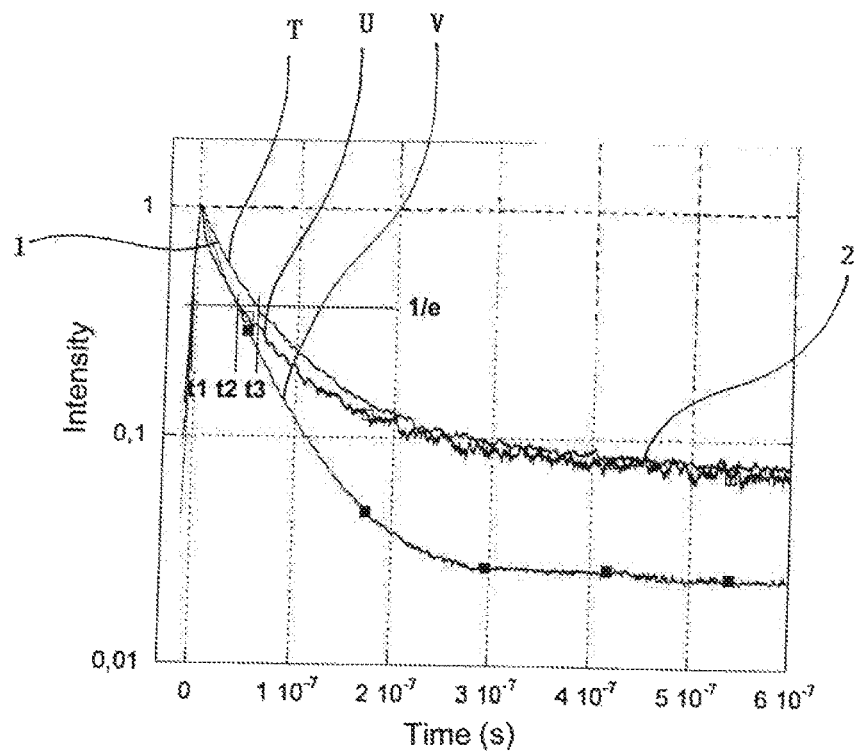
FIG. 14 illustrates scintillation response of crystals LuAG:Ce (T curve), YAG:Ce, Nd (U curve) and LuAG:Ce, Nd, Mg (V curve)

The overlap of the emission band of the $Ce^{3+}$ centre with maximum at 525 nm and absorption band transitions of the centre $Nd^{3+}$ $^4I_{9/2}>^4G_{5/2}$, $^4G_{7/2}$ Nd3+ 4I9/2□4G5/2,4G7/2 (W. T. Carnal) et al, *J. Chem. Phys.* 90, no. 7, 3443, 1989) in the spectrum range of 500-595 nm which corresponds to FWHM of the $Ce^{3+}$ centre emission, causes a non-radiative energy transfer from the $Ce^{3+}$ centre to the $Nd^{3+}$ centre which results in the acceleration of the amplitude-dominant component 1 in the scintillation response which is depicted in FIG. 14. The life time of the amplitude-dominant component of the LuAG:Ce, Nd single crystal is shortened in comparison with 66 ns of the LuAG:Ce material T to 43 ns U. Compared to the YAG:Ce crystal, the scintillation response contains significantly more intensive slow components 2, as can be seen when comparing FIG. 3 and FIG. 12. Their partial suppression may be achieved via the co-doping with the optically inactive double-valent ion (M. Nikl et al, Crystal Growth Design 14, 4827, 2014). The simultaneous application of this co-dopant results in a partial suppression in LuAG:Ce, Nd, Mg of the slow component 2 in the scintillation response in the material with accelerated dominant component 1 of the scintillation response, as illustrated in FIG. 14 where the T curve represents the scintillation response of the LuAG:Ce single crystal, the U curve demonstrates the shortening of the scintillation response of the amplitude-dominant component of the LuAG:Ce, Nd single crystal and the V curve demonstrates the shortening of the scintillation response of both the amplitude-dominant and the amplitude-minor components of the LuAG:Ce, Nd, Mg single crystal.

In other example of execution, the first co-dopant can be from the 3d transition metals group—Ti, V, Cr, Mn, Fe, Co, Ni, Cu, 4d transition metals group—Zr, Nb, Mo, Ru, Rh, Ag, 5d transition metals group—Ta, W, $5s^2$ ions—In, Sn, Sb, or from the $6s^2$ ions group—Tl, Pb, Bi. In another example of execution the $Ca^{2+}$ cation can be used as the second co-dopant.

Example 8—Preparation of Sample of Single Crystals $Gd_3Ga_3Al_2O_{12}$:Ce (GGAG:Ce), GGAG:Nd and GGAG:Ce Co-Doped with Nd (GGAG:Ce, Nd)

The $Gd_3Ga_3Al_2O_{12}$:Ce (GGAG:Ce) single crystal was prepared and grown analogously according to Example 1 when the $Gd_2O_3$, $Ga_2O_3$, $Al_2O_3$, $CeO_2$ and $Nd_2O_3$ binary oxides of 5N purity were mixed. The GGAG:Ce single crystal was grown from the mixture via the Czochralski method under a protective hydrogen/argon atmosphere, the composition of melt for the growth was selected in such a method that the resulting crystal was composed in the ratio of the $Gd_{2.955}Nd_{0.03}Ce_{0.015}Ga_3Al_2O_{12}$ chemical formula. Analogously as in Example 1, the spectra and scintillation responses were subsequently measured. The $Gd_{2.97}Nd_{0.03}Ga_3Al_2O_{12}$ and $Gd_{2.985}Ce_{0.15}Ga_3Al_2O_{12}$ single crystals were prepared in the same method to compare their characteristics.

Figure 15:
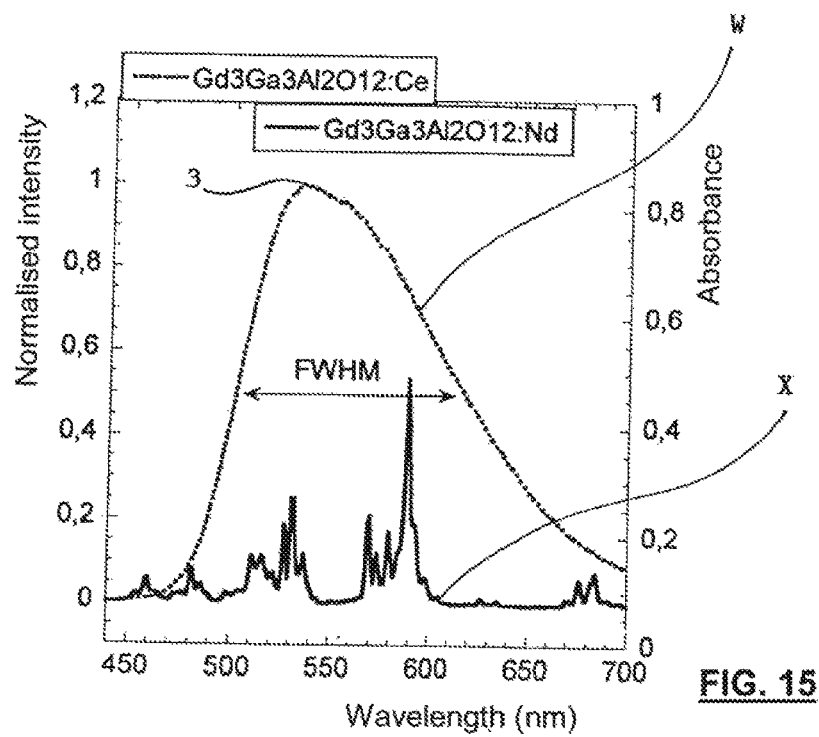
FIG. 15 illustrates scintillation spectrum of single crystal GGAG:Ce (W curve) with marked half width of emission band and absorption spectrum of the GGAG:Nd single crystal (X curve)
Figure 16:
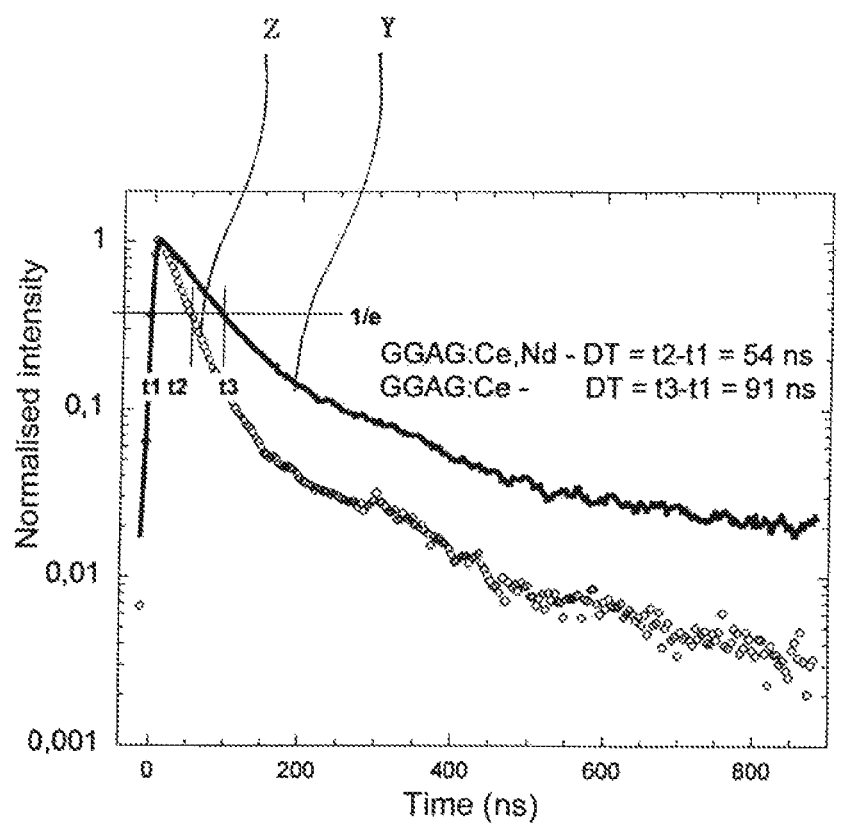
FIG. 16 illustrates scintillation response of crystals GGAG:Ce (Y curve) and GGAG:Ce, Nd (Z curve).

FIG. 15 illustrates with the W and X curves the overlap of the emission band of the $Ce^{3+}$ centre of the GGAG:Ce single crystal with marked maximum 3 at 535 nm and absorption transitions of the centre $Nd^{3+}$ $^4I_{9/2} \rightarrow {}^4G_{5/2}$, $^4G_{7/2}$ (W. T. Carnal) et al, J. Chem. Phys. 90, no. 7, 3443, 1989) in the spectrum range of 500-612 nm which corresponds to FWHM of the $Ce^{3+}$ centre emission, causes an non-radiative energy transfer from the $Ce^{3+}$ centre to the $Nd^{3+}$ centre which results in the acceleration of the amplitude-dominant component 1 in the scintillation response which is depicted in FIG. 16, where the Y curve illustrates the scintillation response of the GGAG:Ce common material and the Z curve illustrates the scintillation response of the GGAG:Ce material co-doped with Nd as the first co-dopant. Both the materials were excited by gamma radiation of the photon energy 511 keV from the radioisotope $^{22}$Na. FIG. 16 illustrates with the Y curve the life time t3 of the GGAG:Ce crystal and with the Z curve the life time t2 of the GGAG:Ce, Nd crystal which is shortened to 54 ns in comparison with 91 ns of the GGAG:Ce material. Time t1 represents the start of the experiment.

Example 9—Fast Scintillation Detector of Secondary Electrons

A double-sided polished scintillation disk with the diameter of 10 mm and thickness of 1 mm was manufactured from the $Y_{0.985}Tb_{0.01}Pr_{0.005}AlO_3$ crystal, grown in Example 4. On surface it was provided with aluminium coating of the thickness of 50 nm. The disc was glued in the face of the all-sides polished cylinder from quartz glass. Positive potential+10 kV is lead to the aluminium coating. The positive potential attracts electrons to the scintillation disk and inside it, fast light flashes are created. The quartz cylinder leads light pulses from the scintillation disc to the fast optical detector. The assembly of the scintillation disc and quartz cylinder is placed in the electronic scanning microscope chamber and enables to detect the signal of secondary electrons with a time response of 5 ns/pxl.

Example 10—Fast Scintillation Detector of Secondary Electrons

A plate with the diameter of 15 mm and thickness of 2 mm in epitaxial quality was polished from the undoped YAG single crystal. 20 μm thick layer of $Gd_{2.955}Nd_{0.03}Ce_{0.015}Ga_3Al_2O_{12}$ was applied onto the surface of the plate via the LPE (Liquid Phase Epitaxy) method. The scintillation disc was worked and except for one head surface, the epitaxial layer was polished off. A thin conductive ITO coating was coated onto the surface with the LPE layer. The disc was glued in the face of the all-sides polished cylinder from quartz glass. Positive potential+10 kV is lead to the aluminium coating. The positive potential attracts electrons to the scintillation disk and inside it, fast light flashes are created. The quartz cylinder leads light pulses from the scintillation disc to the fast optical detector. The assembly of the scintillation disc and quartz cylinder is placed in the electronic scanning microscope chamber and enables to detect the signal of secondary electrons. When compared to the same detector which contains a polished YAG:Ce disc, this detector has a higher light yield and operates with a shorter time response.

Example 11 Single Crystal Detector for PET Applications

The LYSO:Ce co-doped with Dy and GGAG:Ce co-doped with Nd single crystals were grown via the Czochralski method. Elements of 2×2×10 mm, polished from all sides, were prepared from each single crystal. From these elements the modules (matrix) were composed with the size of 8×8 elements (pixels) which were optically separated from each other. Both the matrices were connected together optically with the accuracy of minimally 0.1 mm, pixel to pixel. The whole element was inserted in a plastic casing and the crystal was optically connected with 64-pixel APD. The whole module was used in a positron scanner for tumour imaging in small animals, with a high special resolution and speed.

Example 12—Fast Detector for High Energy Particles Detection

A LuAG:Ce, Nd, Mg single crystal was grown via the Czochralski method according to Example 7 with a higher concentration of Nd in such a method that the response of the single crystal on the cerium centre was 20 ns. Fibres of the size 1×1×140 mm were prepared from the single crystal and all the surfaces were polished. A pixel detector was assembled from the fibres so that the fibres were interlaid with a tungsten sheet of 1 mm thickness. The detector contained 8×8 fibres. The detector was constructed in such a method that there were no optical leaks among the individual fibres. The pixels were insulated from each other with tungsten. The detector was connected at its end with a 64-pixel APD. The detector was used as an electromagnetic calorimeter to detect high energy particles originating in a proton-proton collider with the timing of 25 ns. Due to its short response this solution significantly increased the efficiency of particles detection.

INDUSTRIAL APPLICABILITY

Scintillators with a shortened time of response according to the invention will be utilized in medical applications, working with ionizing radiation, such as positron emission tomography (PET) or CT, in scientific applications, such as in various calorimetric detectors, and in industry, particularly in detectors for the quality control of internal structures of mass produced products, such as chips, or e.g. during border controls.

The invention claimed is:

1. A scintillator material based on a garnet with a general chemical formula of $A_3B_5O_{12}$ which shortens the scintillation response, wherein said scintillator corresponds to the general chemical formula $A_{3-x1-x2}{}^1M_{x1}{}^2M_{x2}B_5O_{12}$ where the substituent A is represented by a cation from the $Y^{3+}$, $Lu^{3+}$, $Gd^{3+}$ group or their mixture, the substituent B is represented by a cation from the $Al^{3+}$, $Ga^{3+}$, $Sc^{3+}$, $Mo^{3+}$ group or their mixture, the substituent $^1M$ represents the dopant cation from the $Ce^{3+}$ or $Pr^{3+}$ group, and the substituent $^2M$ represents a mixture of a first co-dopant selected from the group consisting of Nd, Sm, Eu, Tb, Dy, Ho, Er, Tm, Ti, V, Cr, Mn, Fe, Co, Ni, Cu, Zr, Nb, Mo, Ru, Ag, Ta, W, In, Sn, Sb, Tl, Pb or Bi and a second co-dopant selected from the group consisting of optically inactive ions, $Mg^{2+}$ or $Ca^{2+}$.

* * * * *